United States Patent [19]

Schweizer et al.

[11] Patent Number: 5,181,254
[45] Date of Patent: Jan. 19, 1993

[54] METHOD FOR AUTOMATICALLY IDENTIFYING TARGETS IN SONAR IMAGES

[75] Inventors: Philipp F. Schweizer, Monroeville; Walter J. Petlevich, Jr., Uniontown, both of Pa.

[73] Assignee: Westinghouse Electric Corp., Pittsburgh, Pa.

[21] Appl. No.: 628,116

[22] Filed: Dec. 14, 1990

[51] Int. Cl.$^5$ .......................... G06K 9/00; H04N 5/31; H04B 11/00
[52] U.S. Cl. ...................... 382/1; 358/112; 367/131; 382/43; 382/54
[58] Field of Search ............... 382/54, 22, 41, 1, 43; 367/131, 7; 209/590; 358/112

[56] References Cited

U.S. PATENT DOCUMENTS

| | | | |
|---|---|---|---|
| 4,363,104 | 12/1982 | Nussmeier | 382/41 |
| 4,790,027 | 12/1988 | Scherl | 382/22 |
| 5,003,618 | 3/1991 | Meno | 382/54 |
| 5,060,278 | 10/1991 | Fukumizu | 382/14 |
| 5,065,444 | 11/1991 | Garber | 382/54 |

OTHER PUBLICATIONS

Phillipp F. Schweizer and Walter J. Petlevich, "Automatic Target Detection and Cuing System for an Autonomous Underwater Vehicle (AUV)", Proceedings of Sixth Symposium on Unmanned, Untethered Submersibles, Oct. 1989.
S. Y. Kung and J. N. Hwang, "A Unified Systolic Architecture for Artificial Neural Networks", Journal of Parallel and Distributed Computing 6, 358-387 (1989).
Dean A. Pomerleau, George L. Gusciora, David S. Touretzky and H. T. Kung, "Neural Network Simulation at Warp Speed: How We Got 17 Million Connections Per Second", Proc. 1988 IEEE Int'l. Conf. on Neural Networks, pp. 143-150.
Akira Iwata, Yukio Yoshida, Satoshi Matsuda, Yukimasa Sato and Nobuo Suzumura, "An Artifical Neural Network Accelerator Using General Purpose 24-Bits Floating Point Digital Signal Processors", Proc. 1989 IEEE Int'l. Joint Conf. on Neural Networks, pp. II-171-175.

Primary Examiner—Leo H. Boudreau
Attorney, Agent, or Firm—D. Schron

[57] ABSTRACT

To detect and classify features in a sonar image comprised of a matrix of pixels each pixel having a known greyness level a set of windows is defined such that each window is comprised of a set of adjacent pixels such that every pixel of the image is included in at least one window. Properties of the greyness level for the pixels in each window are defined to enable selection of those windows having specific features of greyness level in excess of a predetermined threshold. Matched filter correlations are performed on the pixels in the selected windows to identify highlights and shadows. The identifying highlights and shadows are classified as targets, anomalies or background.

5 Claims, 13 Drawing Sheets

METHOD FOR AUTOMATICALLY IDENTIFYING TARGETS IN SONAR IMAGES

FIELD OF INVENTION

The invention relates to a method for detecting man made objects and natural features in sonar imaging.

BACKGROUND OF THE INVENTION

Sonar has long been used for detecting objects on the ocean bottom. A sonar image typically is comprised of a matrix of points or picture elements (pixels) displayed on either a cathode ray tube or paper. The points or pixels have a greyness level ranging from 0 to 255 on a greyness scale. Objects normally appear on sonar images as a highlight shadow combination, particularly when the sonar images are generated by a moving vehicle. A sonar scan for short distances typically comprises a massive amount of data which must be reviewed in short time periods. Prior to the present invention this review was done by human analysts looking at the sonar scans. As the analyst reviews the scans he marks areas where he has inferred specific objects or features may be present on the ocean bottom. Because of the massive amounts of data that must be reviewed in short time periods, human analysts are subject to frequent errors or omissions in both detection and classification.

Automatic detection and classification systems for sonar images do not currently exist. Automatic detection systems developed for optical images do not work well for noisy sonar images. Techniques used on optical images including binarizing the image and using run-length encoding, connectivity analysis of image segments, line and edge detection, and pattern classifiers such as Bayes, least squares, and maximum likelihood do not perform well on sonar images. The noisy nature of sonar images also precludes the use of line and edge detection operators. Extensive filtering of the image to reduce noise, reduces contrast to a level where automatic detection systems which have been tried have generated an exceptionally high false alarm rate. Accordingly, there is a need for an automatic target cuing system for sonar images. The system must have extremely high throughput rates, many hundreds of thousands/sonar picture elements (pixels) per second. Such high rates preclude the use of complicated algorithms on single CPU architectures.

SUMMARY OF THE INVENTION

We have developed a method and apparatus for analyzing sonar images to identify targets within the image. These targets typically consist of highlight and shadow combinations, highlights alone and/or shadows alone. Our method and apparatus identify highlight clusters and shadow clusters, highlight ridges, shadow troughs, anomalies and background within the sonar image. We begin by defining scan windows within the sonar image. We prefer to define each scan window as a matrix of 10 rows by 20 columns of pixels. We further prefer that each window contain a portion which overlaps a portion of another window. Each window is scanned over the image column by column and row by row. Each window is then classified as target, target highlight, target shadow, or background.

We are unaware of any single algorithm or processing technique that is adequate to achieve the high probability of detection (e.g. greater than 90%) and the low false alarm rate (e.g. less than 1% of targets detected) needed by a sonar image automatic target cuer. We prefer to combine the advantages of three processing techniques while eliminating the disadvantages (false alarms) of each. Each processing system operates simultaneously on the sonar image to classify windows which contain targets as contrasted with those which contain background only. The window locations classified as targets are passed to a combined cuer process which combines the windows into a bounding target window and eliminates those windows that do not have the proper supporting evidence from the three processes.

One detection process designated as the shadow highlight detector scans a filter over the sonar image to match highlight, shadow, and background representations in the filter with those in the underlying sonar image. A second detection process computes a greylevel histogram of each scan window in the image. This process also calculates the maximum number of pixels in the scan window with a greylevel between various upper and lower bounds (designated as pixel run length or scan lengths). Target windows are designated by comparing the greylevel histograms and maximum pixel run lengths between each scan window and an average background window. The background window is derived by locating multiple windows in each sonar image frame and deriving average greylevel histograms and pixel run lengths. The third detection process uses a two stage neural network to classify the scan windows. The first stage neural network detector uses a three layer feedforward network with sigmoid transfer function. This network is trained using the backpropagation algorithm to detect highlight, shadow, and background windows. The two dimensional (row by column) spatial arrangement of greylevels is processed using a two dimensional Fast Fourier Transfer algorithm to derive a frequency representation (spectral components). These spectral components are then scaled and combined using symmetry and averaging. The reduced set of spectral components are then used as input to this first stage neutral network. The second stage neural network accepts as input the spatial location of each scan window detected as a highlight or a shadow by the first stage. This second network has a single input for shadows and highlight and for each location in a 50 row by 50 column two dimensional representation of the sonar image. This second stage network is trained to spatially correlate the detected highlight and shadow window locations from the first stage neural network. Windows from the first stage are located to the nearest row and column of the second stage representation. For example a 512 row by 512 column image would be approximately represented by a 50 row by 50 column grid. The second stage neural network output is trained to recognize highlight clusters, shadow cluster, highlight ridges, shadow troughs, greylevel anomalies and background. This three layer feedforward second stage network using a sigmoid transfer function is also trained using the backpropagation algorithm.

A combined cuer process accepts detections from the highlight-shadow, statistical and neural network cuers, and classifies areas (larger windows) of the sonar image as target areas. Detections from the three cuing processes that do not provide supporting evidence are eliminated.

The parallel processing capability of the three cuing processes allows sonar images to be processed simultaneously and accurately at rates of at least 575,000 pixels per second. This provides a faster processing rate from stored image data than most real time sonar sensor collection systems achieve. Equivalently, our system may process data from many collection systems simultaneously.

Other objects and advantages of our method for analyzing sonar images will become apparent as a description of present preferred embodiments proceeds.

DESCRIPTION OF THE PREFERRED EMBODIMENTS

Sonar images are generated when a sonar signal is emitted, strikes an object and returns to a sensor sound transducer. Typically several hundreds of sensor transducers are utilized to form a linear array. Arrays are typically positioned on the vehicle port and starboard side but may also be located at other positions on the host vehicle body.

When a sonar image is generated it is important to know the configuration of the sonar array from which it has been generated. Various devices exist for receiving the signal from the sensor arrays and transforming that signal into a sonar image which may be displayed on a screen or on a paper. Generally, such devices include a central console and a composite image generator. A sonar image is comprised of a matrix of pixels having a greyness level typically on a scale from 0 to 255. Combination of dark pixels called shadows and light pixels called highlights typically correspond to an object on the bottom of the ocean. Objects may also be represented in the image by highlights or shadows alone.

Figure 1:
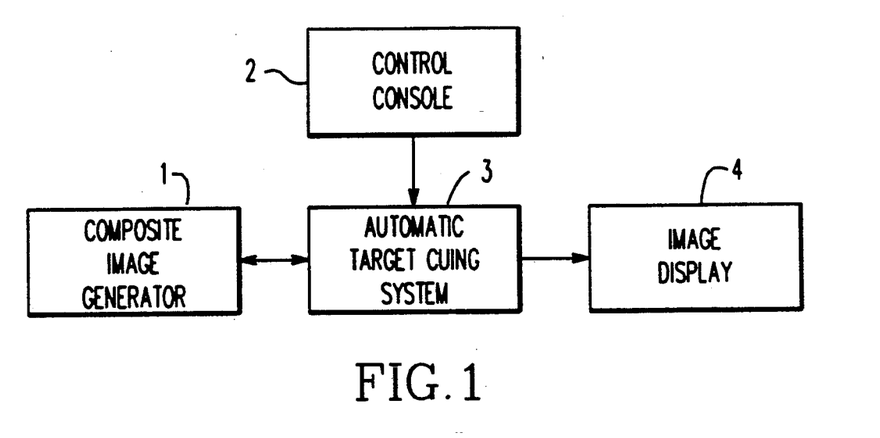
FIG. 1 is a block diagram showing our present preferred system for automatic target detection of a sonar image.
Figure 2:
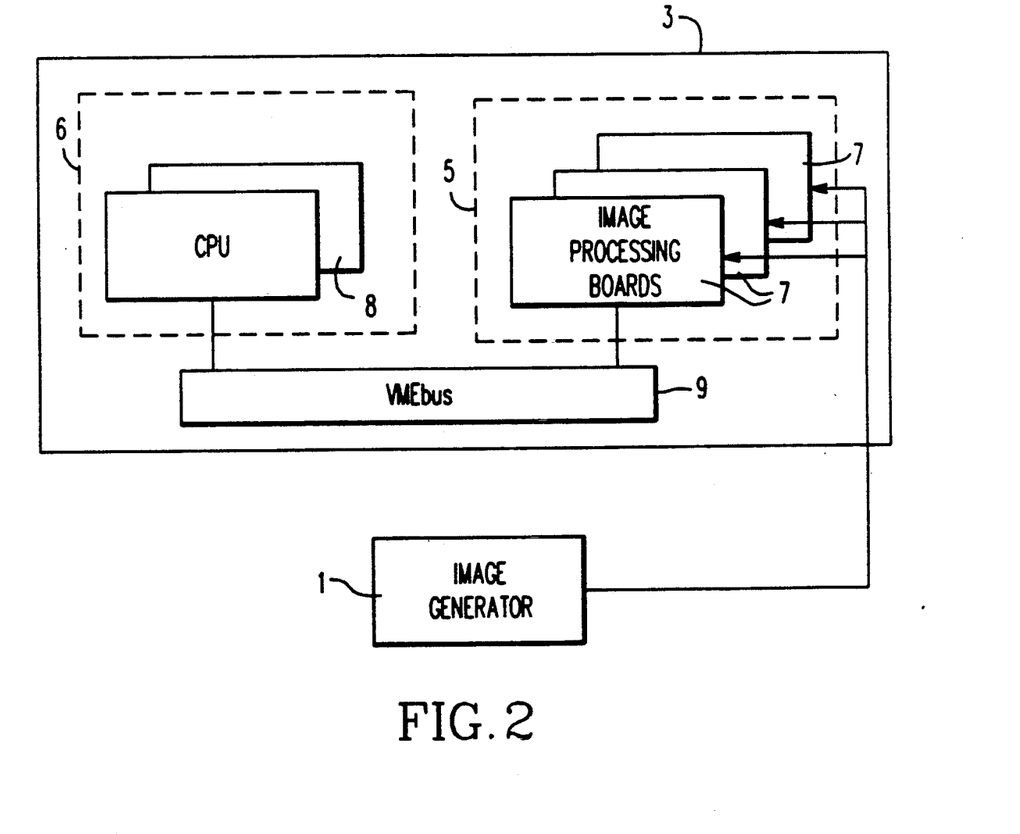
FIG. 2 is a block diagram showing the hardware used to implement the automatic target cuer of FIG. 1.

Referring to FIG. 1, we provide a system for automatic target detection which includes a sonar image generator 1 and a control console 2. These units are standard devices used in most conventional sonar systems. For example, one sonar image generator is made by Westinghouse and sold under the name AN/AQS14 Navy Mine Countermeasure Sonar. A suitable control console is made by Sun Microsystems and sold under the name Sun 3/260C workstation. The control console enables the operator to activate the sonar system, the sensing transducers and the sonar image generator. The control console also relays to the automatic cuing system 3 information about the sonar signal, configuration of the sensor arrays, whether the sonar signal has been generated on the port side or the starboard side, and whether the sensor arrays being utilized are on the port side or the starboard side. Our automatic target cuing system 3 receives sonar images from the image generator 2. The image are processed and targets are identified in a manner which will be described hereafter. Then, the processed image as well as information determined in our automatic target cuing system 3 about the present position of targets is transmitted to a display 4 which may be a cathode ray tube or paper. As illustrated in the block diagram of FIG. 2, our automatic target cuing system 3 contains algorithms implemented with CPU and memory 5 and 6. The sonar image information is transmitted through and processed in a series of processing boards 7. We prefer to use Matrox MVP-VME image processing boards. The Matrox-VME image processing boards accept and store the input sonar pixel image frames. The four detection processes (highlight-shadow, statistical, neural network, and combined cuer) operate on this stored image frame and display intermediate results by modifying pixels in the stored frame and/or by displaying graphical overlays as depicted in FIGS. 10 through 14. The four detection processes are implemented with the well known C Language, compiled and executed on the Sun 68020 cpu board. Eight megabytes of memory 8 are used by the Sun to store programs and intermediate results. This implementation runs all of the algorithms at much slower than the real time collection speed (e.g. 1000 pixels/sec).

Figure 3:
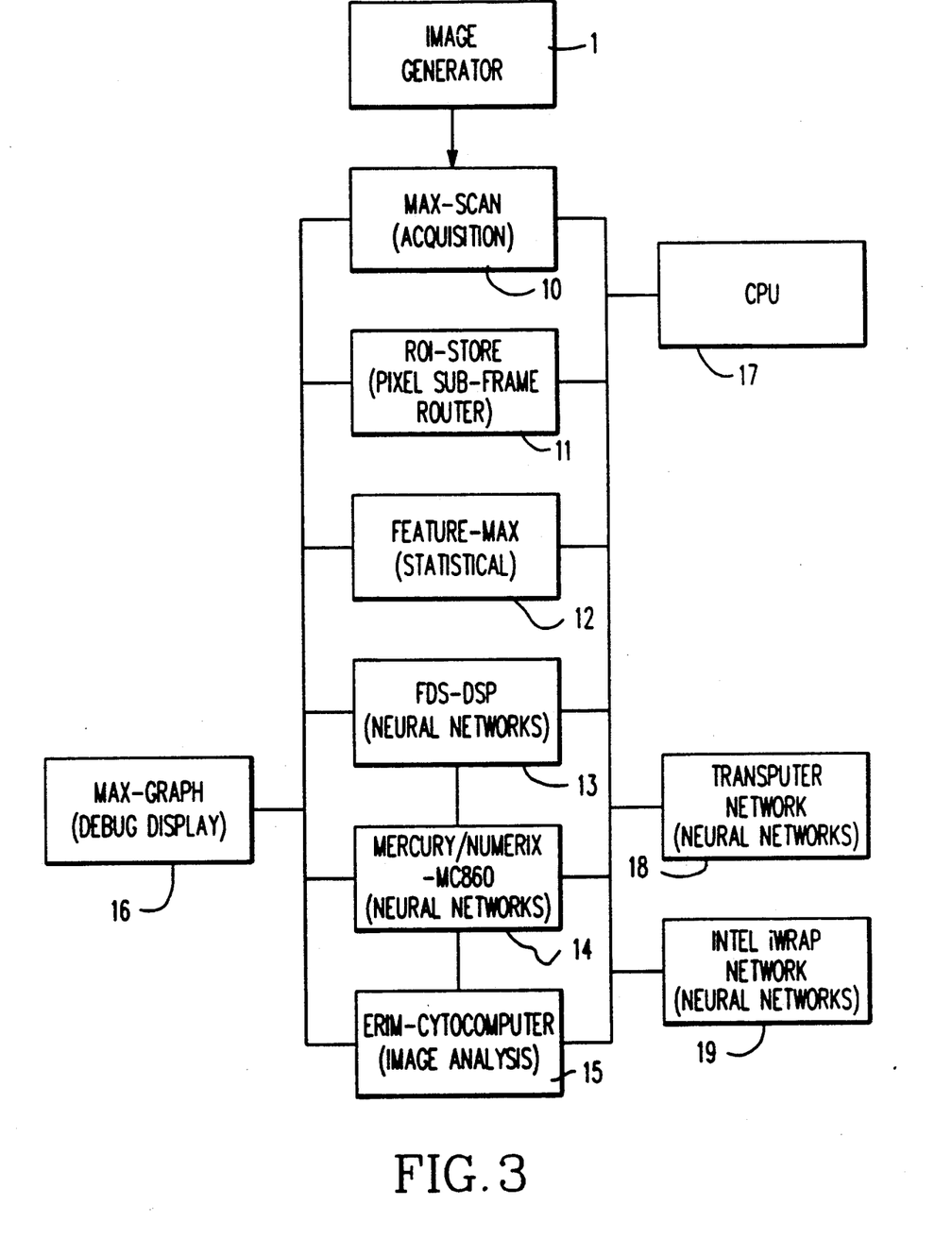
FIG. 3 shows a high speed (high throughput) alternate implementation of the automatic target cuing algorithms.

When high speed image processing is needed (e.g. 600,000 pixels per second) the implementation shown in FIG. 3 must be used. This implementation uses individual VMEbus boards from well known suppliers Data Cube, Force Computers, FDS, ERIM, Mercury/Numerix, Intel, Inmos, and Paracom. The highlight-shadow algorithm is implemented on the ERIM cyctocomputer 15, statistical algorithms run on the Data Cube Feature MAX board 12, neural networks operate on either the Mercury/Numerix MC860 (14) or the other alternates 13, 18 and 19. indicated in FIG. 3. Image data is acquired from the sonar generator through the MAX SCAN board 10 and stored in the ROI-STORE 11. The host controller 17 downloads algorithms and control parameters to each board. The MAX GRAPH board 16 is used to display images on a CRT (e.g. Sony Trinitron or Mitsubishi) which may appear as shown in FIGS. 10 through 14.

Figure 4:
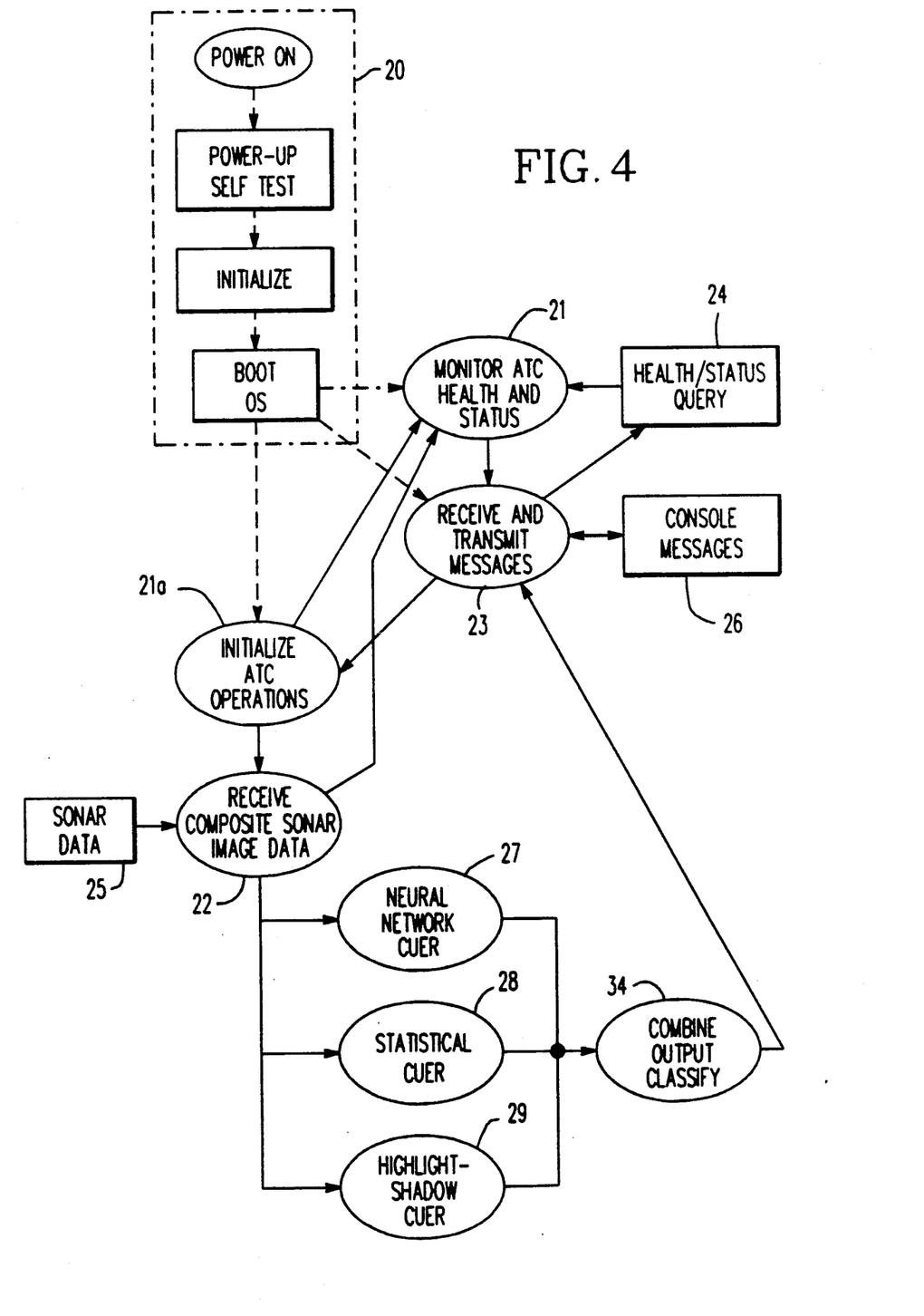
FIG. 4 is a functional block diagram showing the functional interconnection of subsystems in the automatic target cuer.

The operation of our automatic target cuing system is illustrated in the functional block diagram of FIG. 4 in which the solid line arrows indicate functional inputs and outputs and the dotted line arrows indicate control signals. Referring to dotted line block 20 certain actions must be taken to activate our system. As indicated by the smaller blocks within block 20, power is turned on, then the host system which includes the console and image generator undergoes a power-up self test. The host system is initialized and the operating system is booted. Now the console, image generator and automatic cuing system are ready to receive and process sonar images.

As indicated by block 21 and the associated arrows we prefer to monitor the health and status of the automatic target cuing system. Certain activity such as initialization of operations 21a, receipt of sonar image data 22 and receipt and transmission of console messages 23 are routinely monitored. We also prefer to allow health and status queries 24. Our system receives sonar image data indicated by arrow 25 and messages from the console indicated by arrow 26. This information is simultaneously processed through a neural network cuer 27, statistical cuer 28 and highlight shadow cuer 29, operations which are hereinafter described in the context of FIGS. 5 through 9. These operations produce data which is combined as indicated by block 34 and FIG. 9 for detecting and classifying scenes within the input sonar image. The combined data is output through the control console to a paper or cathode ray tube display (see FIG. 1 and FIGS. 10 through 14). The console may also direct the information to a memory (not shown) for storage.

Continuous sonar data input 25 can be processed as a series of overlapping sonar image frames with the buffer storage provided. Our system handles all such frames in the same manner. In FIGS. 10 through 14, we represent a single sonar image frame of 480 rows by 512 columns. We divide each sonar image frame into a set of windows (FIGS. 5 through 14) so that every pixel in the frame is included in at least one window. The windows may be of any desired size. However, we prefer windows having 10 rows by 20 columns. We further prefer to overlap adjacent windows by at least 5 rows or 10 columns of pixels. Each window can be represented as a matrix of pixels, each identified by the greyness level associated with pixels in that image. For example, a window having 5 rows by 10 columns of pixels may have the following representation:

| 25 | 60 | 75 | 45 | 26 | 31 | 23 | 0 | 0 | 6 |
|----|----|----|----|----|----|----|----|----|----|
| 48 | 86 | 137 | 124 | 50 | 0 | 0 | 16 | 35 | 44 |
| 105 | 205 | 255 | 208 | 90 | 0 | 0 | 0 | 9 | 0 |
| 235 | 255 | 255 | 147 | 87 | 82 | 61 | 23 | 0 | 5 |
| 23 | 37 | 87 | 152 | 193 | 140 | 44 | 0 | 0 | 6 |

The great difference between the entries of the first five and last five columns in rows 2 thru 5 is indicative of a highlight and a shadow in the image.

Each of the three detection processes as well as the process of combining these cues are described in the following.

Figure 5:
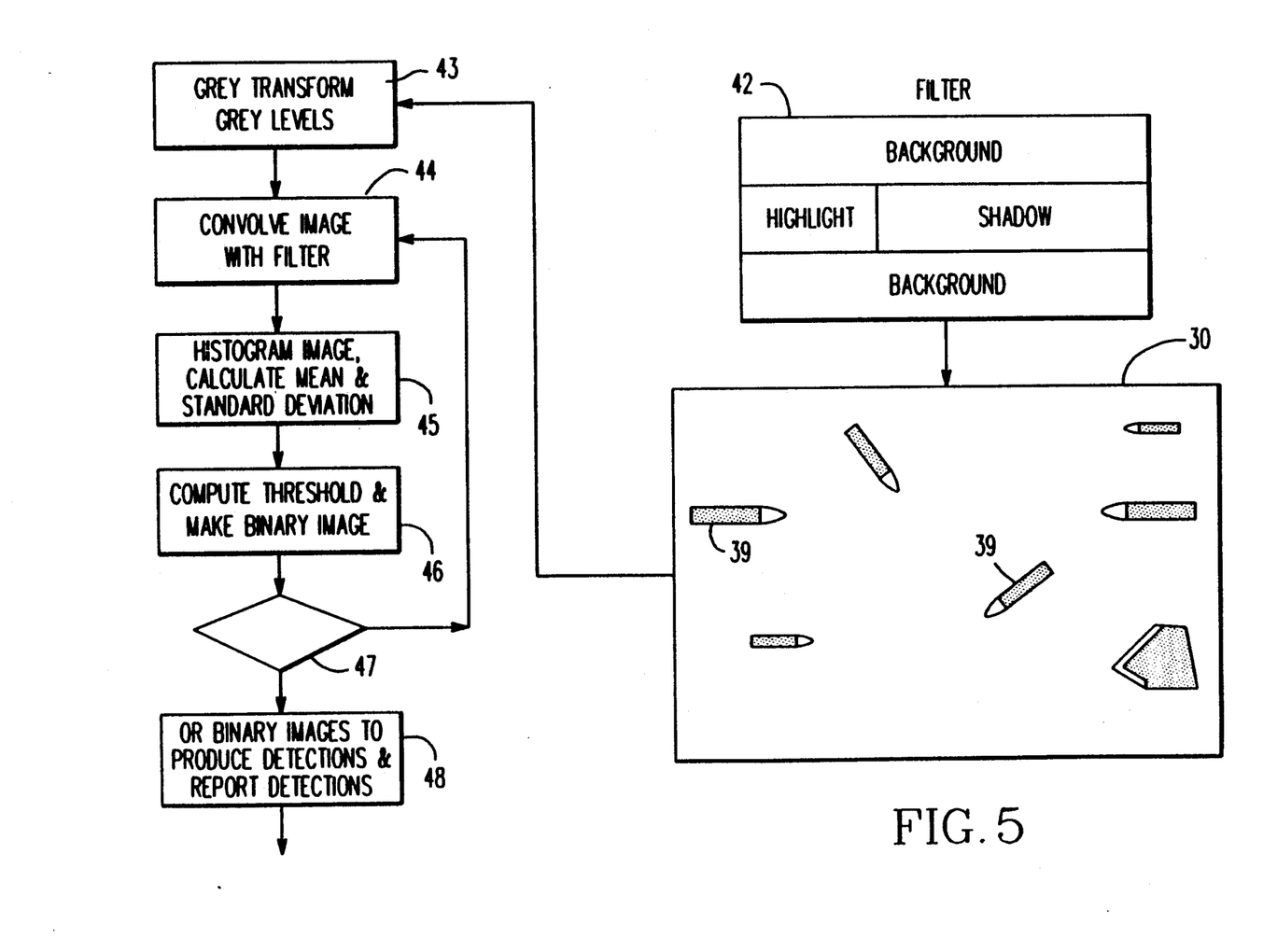
FIG. 5 shows a functional flow diagram for the highlight-shadow matched filter algorithm which is one of the three processes used in the target detection process.

SHADOW-HIGHLIGHT MATCHED FILTER (FIG. 5)

In one process we determine highlights and shadows using at least one filter. Several such features 39 are shown in image 30. We prefer to normalize the image 30 with a log transform, then convolve the sonar image frame with multiple matched filters to detect and locate target areas.

FIG. 5 is a block diagram showing our present preferred process for identifying combinations which we call target detections. We take a log transform of the greylevel of each pixel as indicated in block 43 using the algorithm $$I_{new} = C + K \ln I_{old}$$

Next at block 44 we convolve a series of two dimensional filters with a log transformed image. As indicated by box 42 separate filters may be used for background regions, highlight regions and shadow regions in the image. A maximum of 21 filters may be convolved with the image. These filters are dynamically derived. We prefer filters having a maximum 15 rows by 45 columns and minimum 9 rows by 7 rows. A typical filter is 13 rows by 35 columns.

These filters are separable and each can be implemented with one convolution in the row direction and one convolution in the column direction.

We then create at block 45 a histogram for each convolved image, shift mean and scale. This may be done in sections, preferably sections of 100 rows of 128 columns or in the whole image.

Next, we compute at block 46 a threshold value based on the mean and standard deviation of each histogrammed section. We create a binary image using threshold value for each section which may be further convolved 47. One binary image will be created for each filter used. Each binary image yields the detections for a particular filter.

Finally, we combine at block 48 all binary images of logical OR operations to produce a final binary image corresponding to all detections.

Figures 6, 6A, 6B:
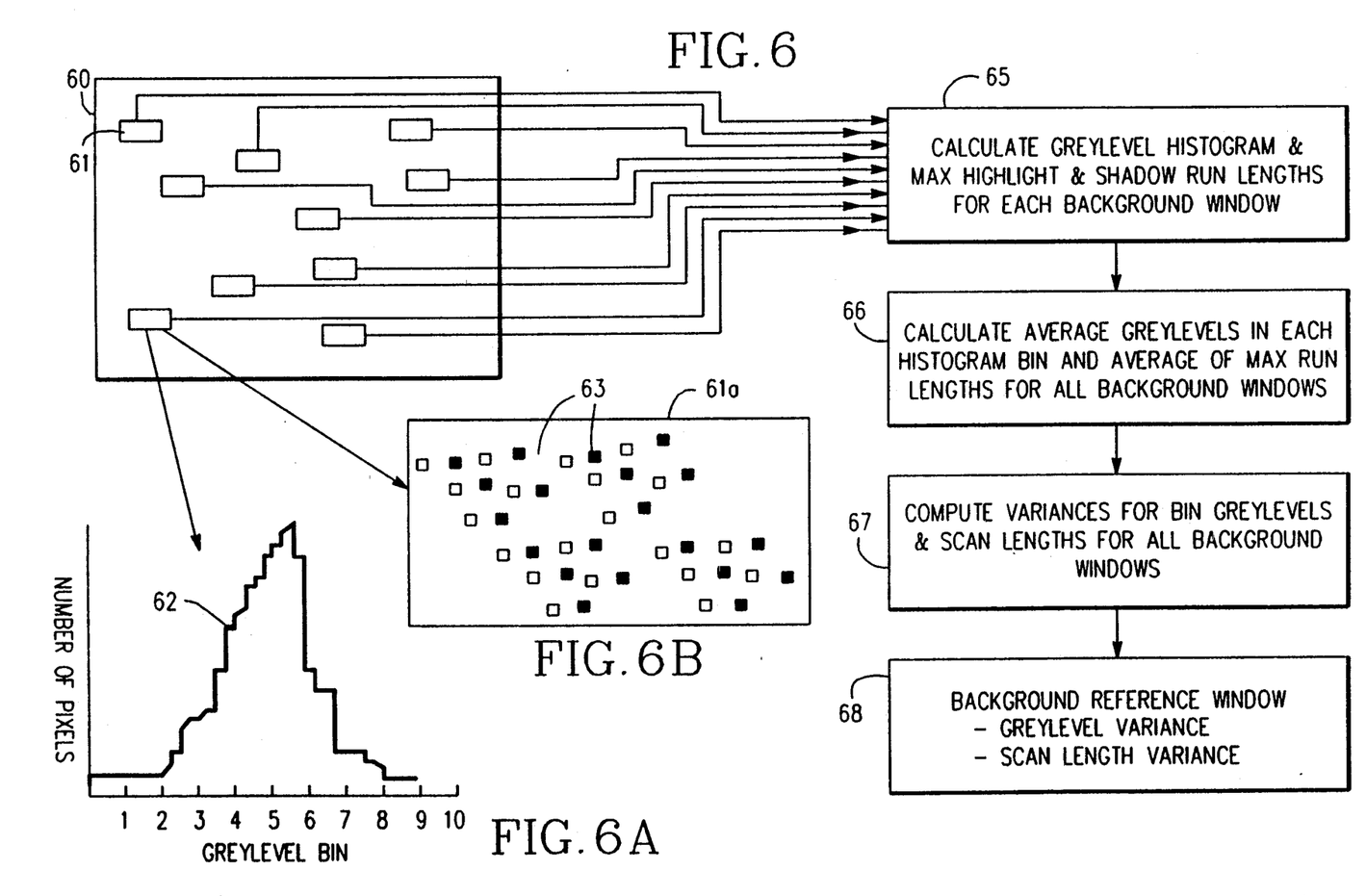
FIGS. 6, 6A, 6B and 7 show the functions implemented by the statistical algorithm which is another of the three processes used.
Figure 7:
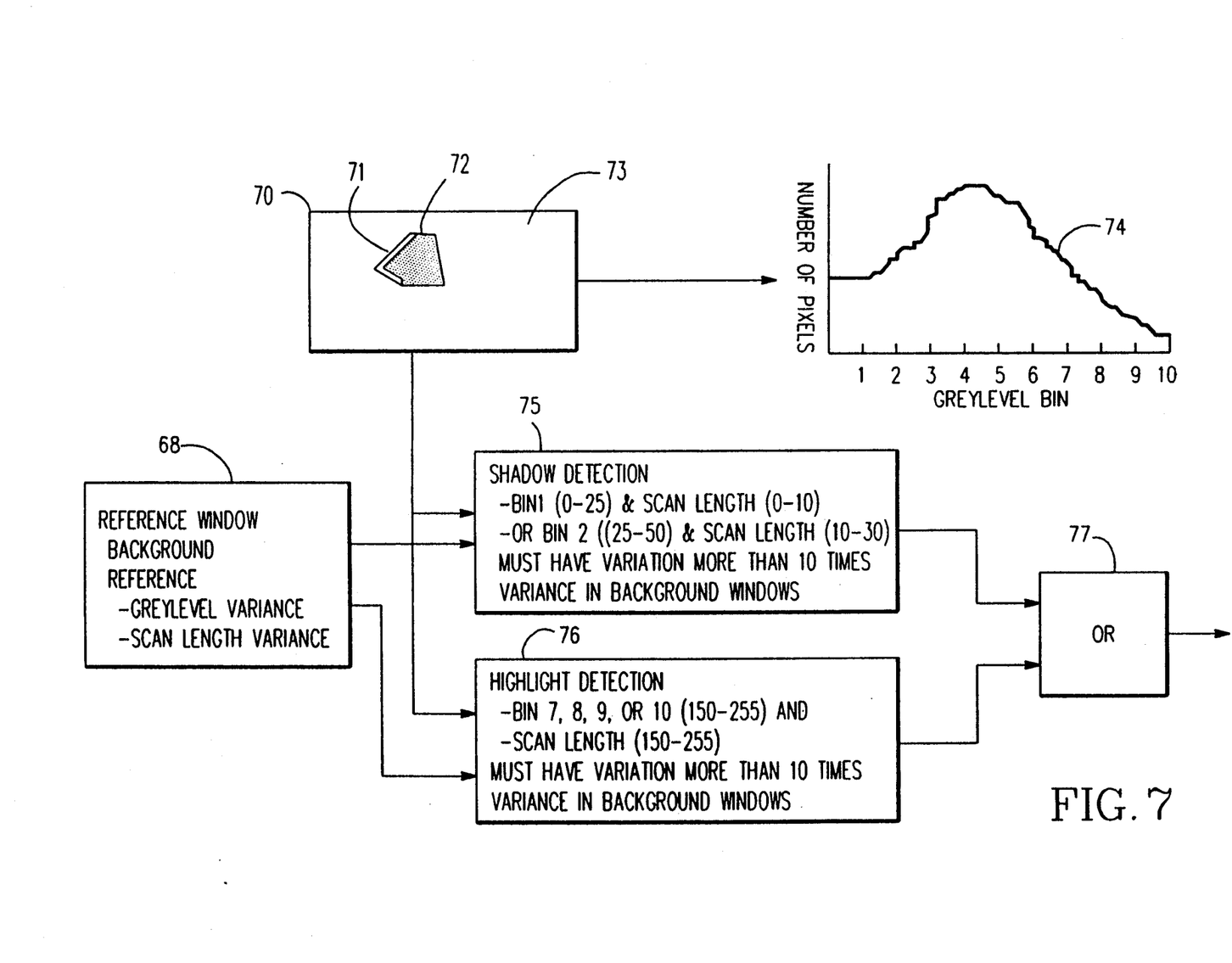

STATISTICAL TARGET CUER (FIGS. 6 & 7)

The statistical target cuer process is outlined in FIGS. 6 and 7. This algorithm first develops a background reference using the procedure shown in FIG. 6. As shown in FIG. 6, a random number generator is used to locate 10 row by 20 column background windows 61 in the image 60. The greylevel histogram 62 and the maximum highlight and shadow run lengths 63 respectively shown as open boxes and closed boxes in window 61a are calculated for each of these windows as indicated by block 65. Our current design uses 10 windows 61, however, this is a parameter that may be set for optimum performance of each specific design. Next, at block 66 the average greylevel histogram and the average of the maximum run lengths are calculated for the background window set. Then at block 67, the variances are computed for each bin greylevel and each run length for the background set. These two values are used to characterize the background and establish a background reference window 68. Once a background reference is established a 10 row by 20 column window is scanned over the image and compared against this reference as shown in FIG. 7.

Turning to FIG. 7, we show a typical scan window 70 having highlight 71, shadow 72 and background regions 73. The highlight 71 and shadow 72 have a run length indicated by the arrows. This length can be expressed in terms of a number of pixels. We prefer to use scan windows containing a 10×20 block of pixels. For each scan window 70, we create a histogram 74 of greylevels. We then take the run lengths and histogram and compare them to the reference window 68. From this comparison we determine if a shadow is present according to the standards in block 75 or if a highlight is present according to the standards in block 76. We combine those answers at block 77 and conclude that a target is present if either a shadow or a highlight has been detected. An more specific description of our preferred algorithm is as follows.

a) Find K random locations for m row by n column background windows in the image under investigation. Choose K=10, m=10 and n=20 as current best values.

b) Histogram the K background windows into 10 bins. Define bins for 8 bit greylevels as levels 0-25, 25-50, 50-75, 75-100, 100-125, 125-150, 150-175, 175-200, 200-225, 225-255.

c) Calculate the average greylevel values for each bin for all of the K background windows.

d) Calculate the maximum scan run lengths for each of the K background windows for greylevel ranges 0-10, 10-30, 150-255.

e) Calculate the average scan run lengths for each greylevel range for the K background window set.

f) Calculate the variations for the histogram bins and the run length ranges for each of the K windows. Compute the variance for each histogram bin and run length for the background windows set.

g) For each scan window in the image under analysis, calculate the 10 bin histogram and the maximum shadow and highlight run lengths for each range.

h) For each scan window calculate the variations of the histogram bin values and run length values. Use the average background window values calculated in steps c and e to compute this scan window variance.

i) Calculate detection criteria:
Shadow Detection
To detect shadows compare values in histogram bins 1 and 2 and shadow run lengths in greylevel range 0-10 and 10-30 against those in the average background window. If the variation in the scan window is larger than the variation in the average background window by a confidence factor then register a detection for that bin or range. Choose confidence factor as 10. A shadow detection is confirmed for detection in bin 1 and range 1 or bin 2 and range 2.

j) Declare any scan window a target window if either a shadow or highlight detection is confirmed.

Figure 8:
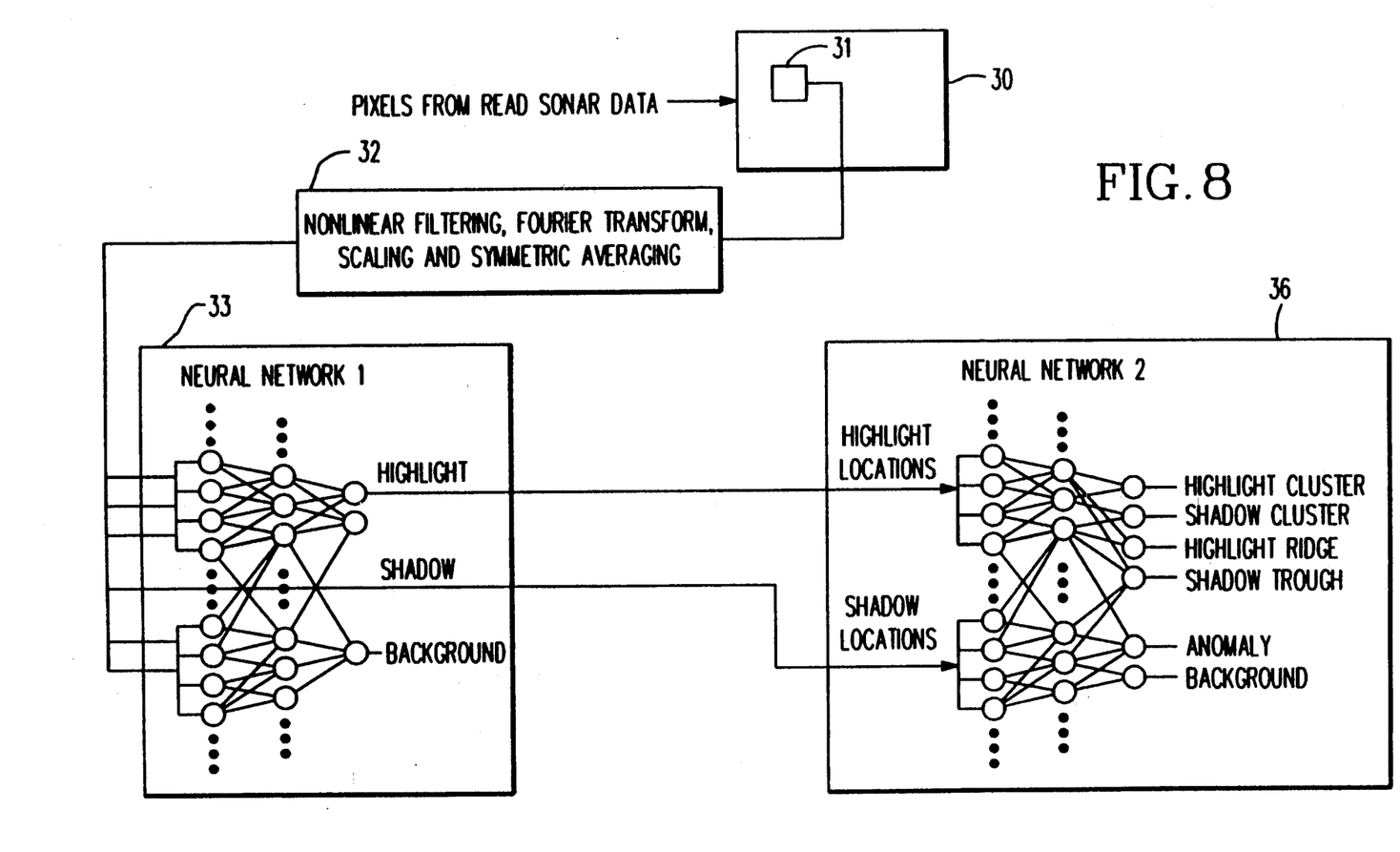
FIG. 8 shows the functions involved in the two stage neural network target detection process.

NEUTRAL NETWORK CUER (FIG. 8)

The neural network cuer (NNC) is composed of two networks: 1) the neutral network shadow and highlight detector and 2) the neural artwork spatial correlator. FIG. 8 shows a functional flow of information in the NNC. An 8 row by 16 column window 31 is scanned over the image 30 and the pixel values in the window are transformed to the frequency domain using a Fast Fourier Transform (FFT) algorithm as indicated by box 32. We depart from 10 row by 20 column previously used to speed FFT processing. The major and minor axis values for this frequency spectrum are then used as input to the first stage of the neural network 33. The spectral values are normalized by dividing each by the F(0,0) value of the spectrum which makes the spectrum invariant with background greylevel. The frequency spectrum is also invariant to the location of the target within the window by nature of its definition. This FFT processing and normalization stage reduces the variation of input windows for which the network must be trained. It also reduces the required network size to 25 neurons on the input layer, 50 hidden layer, and 3 output layer.

The inputs to the second neural network 36 are analog values range from zero to one. The row values are scaled such that row 480 corresponds to one and zero to analog value zero. The column values are similarly scaled with 1 corresponding to column 512 and zero to column 0.

The second neural network 36 is trained to perform spatial correlations. Sets of highlight and shadow reports are classified into one of six classes: highlight cluster, shadow cluster, highlight ridge, shadow trough, anomaly, or background. Our preliminary design experiments have shown that pixels associated with all target classes will be less than 10 to 20% of the total number of pixels. This second neural network processing time should be approximately 10 to 20% of that required by neural network 1. These processing times for the spatial neural network must be contained within the total latency times specified in the previous paragraph.

Figure 9:
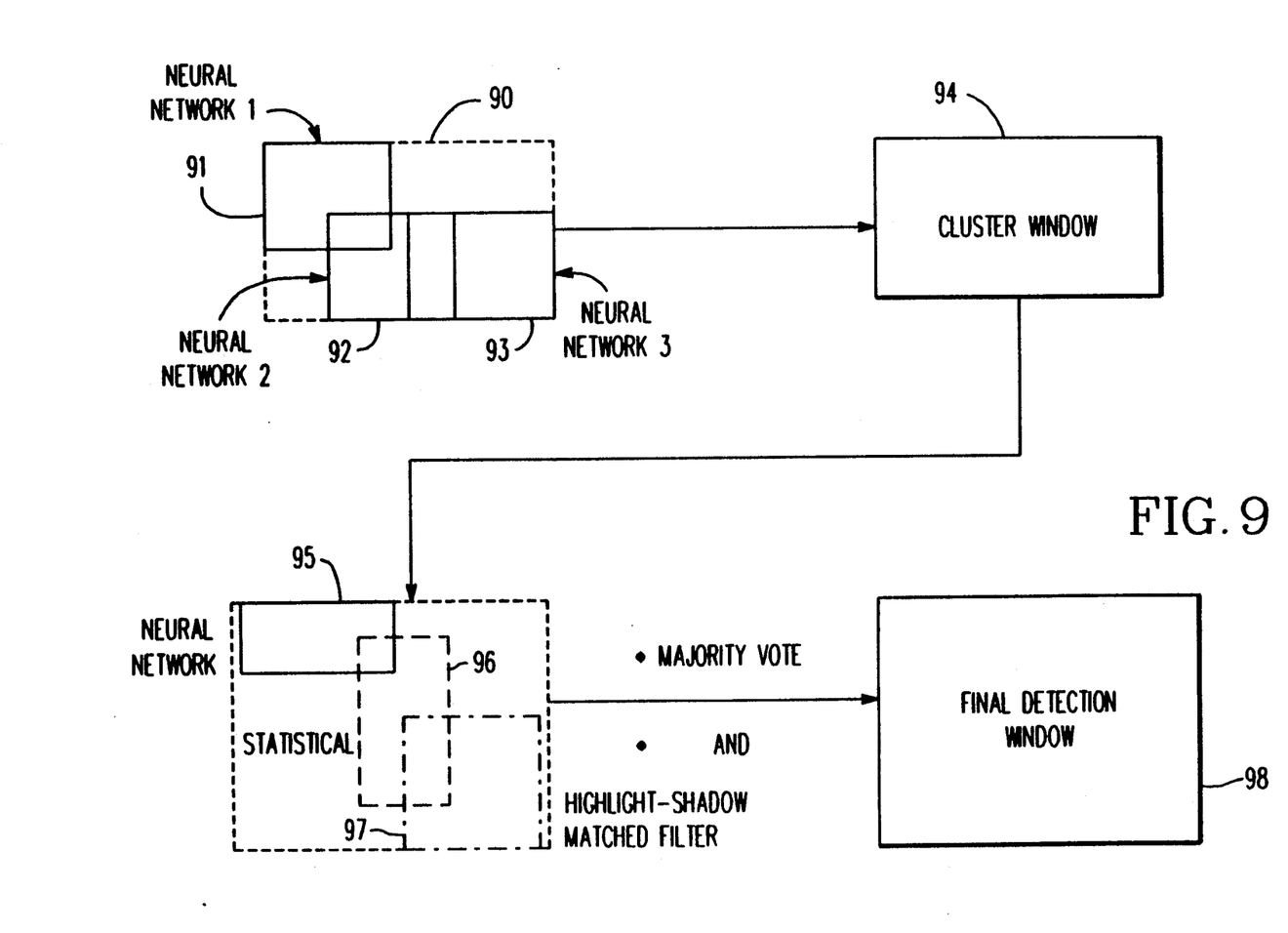
FIG. 9 shows the functions performed by the combined cuer process in arriving at a final target detection.

COMBINED CUER PROCESSING (FIG. 9)

The Combined Cuer Algorithm reduces the false alarm rate for our system by taking advantage of the strengths and weaknesses of each of the three detection processes. FIG. 9 indicates how cues from each detection process are combined into a composite detection designated as a cluster window. As indicated by dotted line block 90 sets of detection windows 91, 92 and 93 from each cuer are merged to produce cluster windows 94. The cluster windows from the neural network cuer 95, the statistical cuer 96 and the highlight-shadow matched filter 97 are merged together into a final detection window 98. These cluster windows from each of the three cuers are combined into a final detection window 98 using majority voting or AND logic. In the algorithm a minimum separation distance is specified for combining windows into a window that bounds each. Currently this distance is set at zero which requires windows to be adjacent or intersecting in order to be combined. The algorithm employs use of linked lists to represent all detected windows and is currently implemented in our laboratory in software. A hardware implementation may be realized using the equipment shown in FIG. 3. The combined cuer is constructed using binary decision logic. For example each detection (window) is either present or not. Information is available from each of the detection processes indicating the confidence of each process in declaring a target detection. This information could be used by the combined cuer to weigh each of the detectors in the combination process. Essentially the binary logic process currently in use gives equal weight to all three detectors for each detection. Current performance on test data has been acceptable and has not required this additional detail.

EXAMPLE

Figure 10:
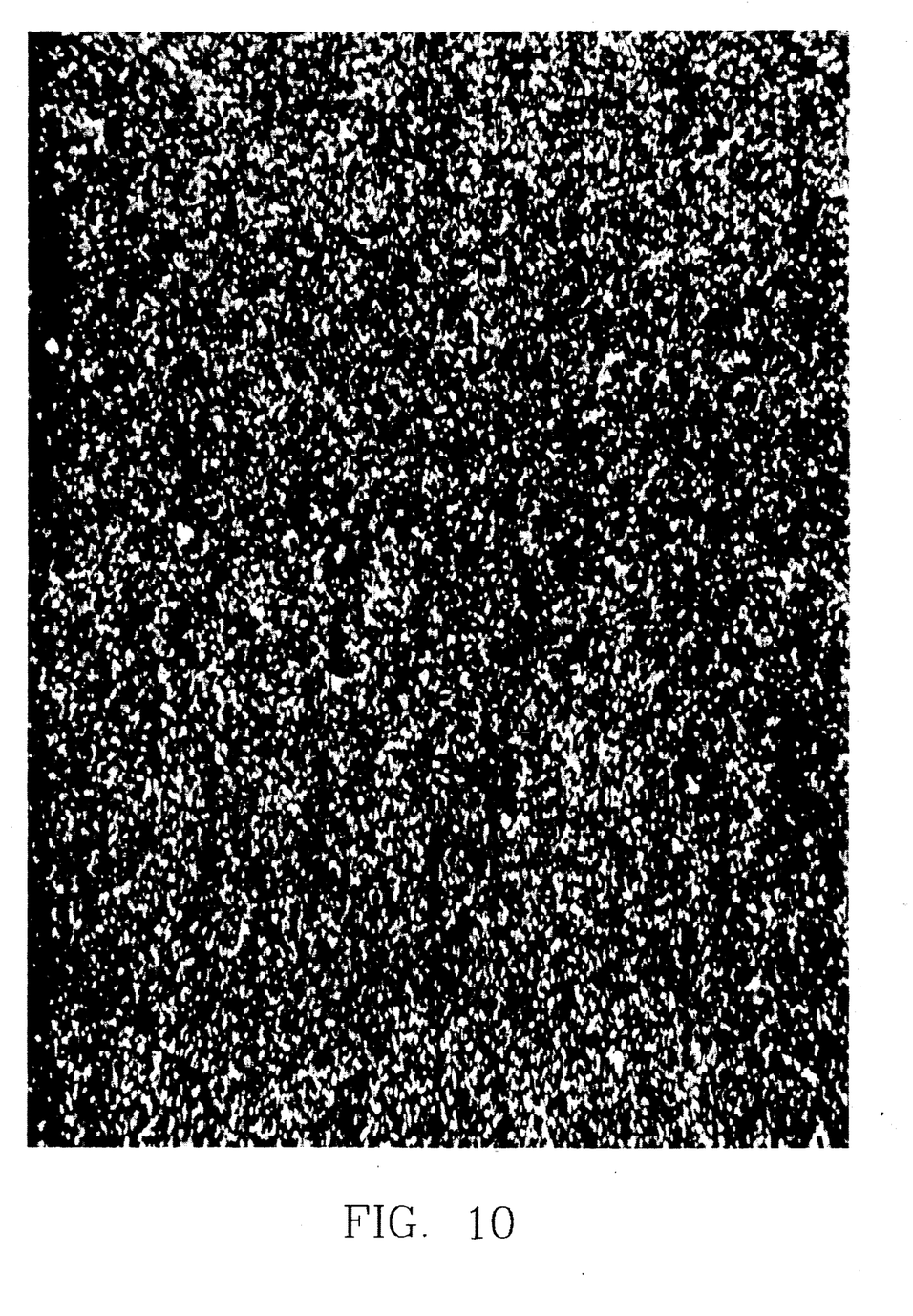
FIG. 10 is a sonar image showing highlights and shadows produced in the image by minelike objects on the ocean bottom. This image was produced with the Westinghouse AN/AQS14 Sonar and displayed using the Automatic Target Cuing Equipment shown in FIG. 2. Five minelike objects are displayed in this image.
Figure 11:
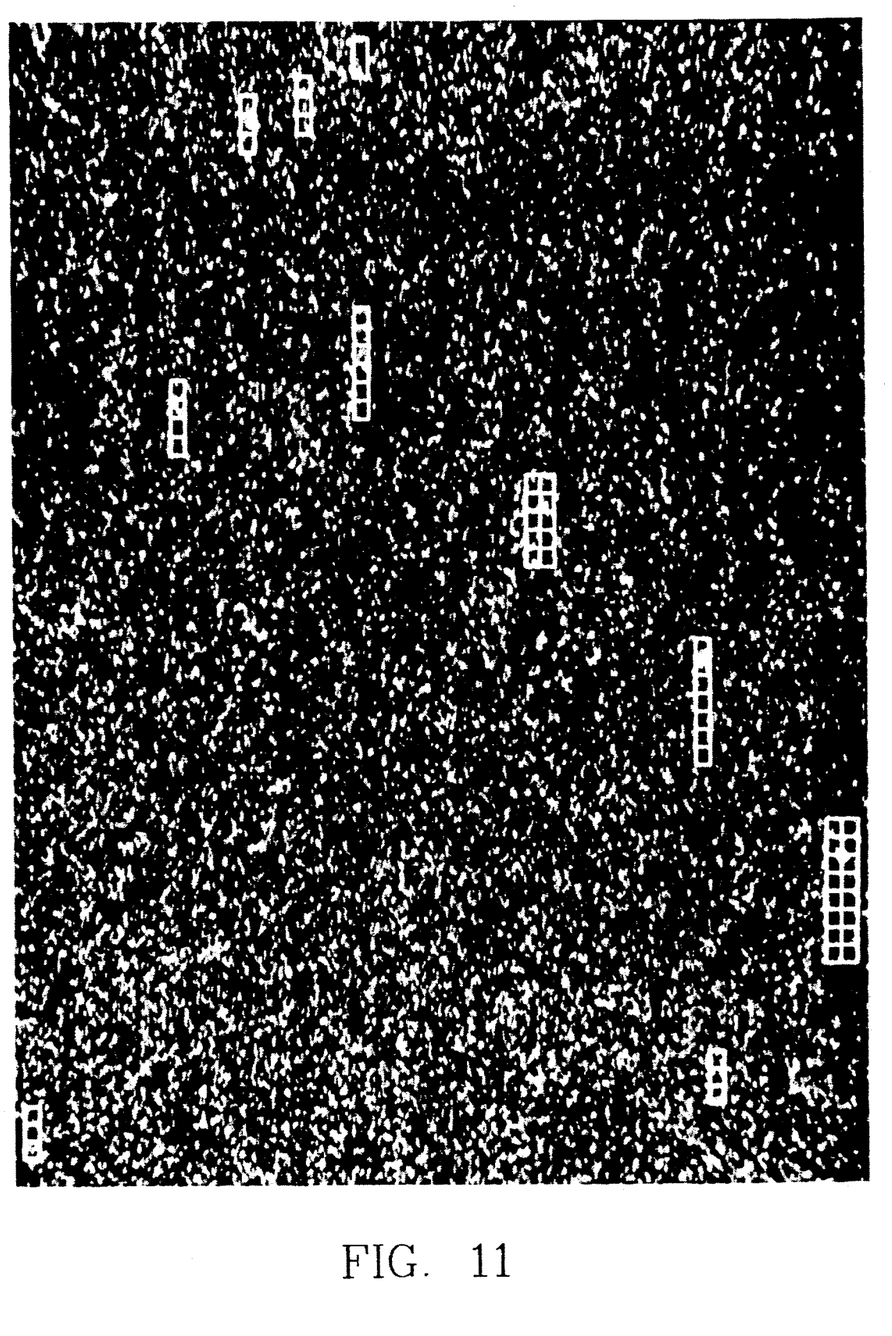
FIG. 11 is a sonar image of targets with graphical overlay showing the results of processing with the shadow-highlight detector.
Figure 12:
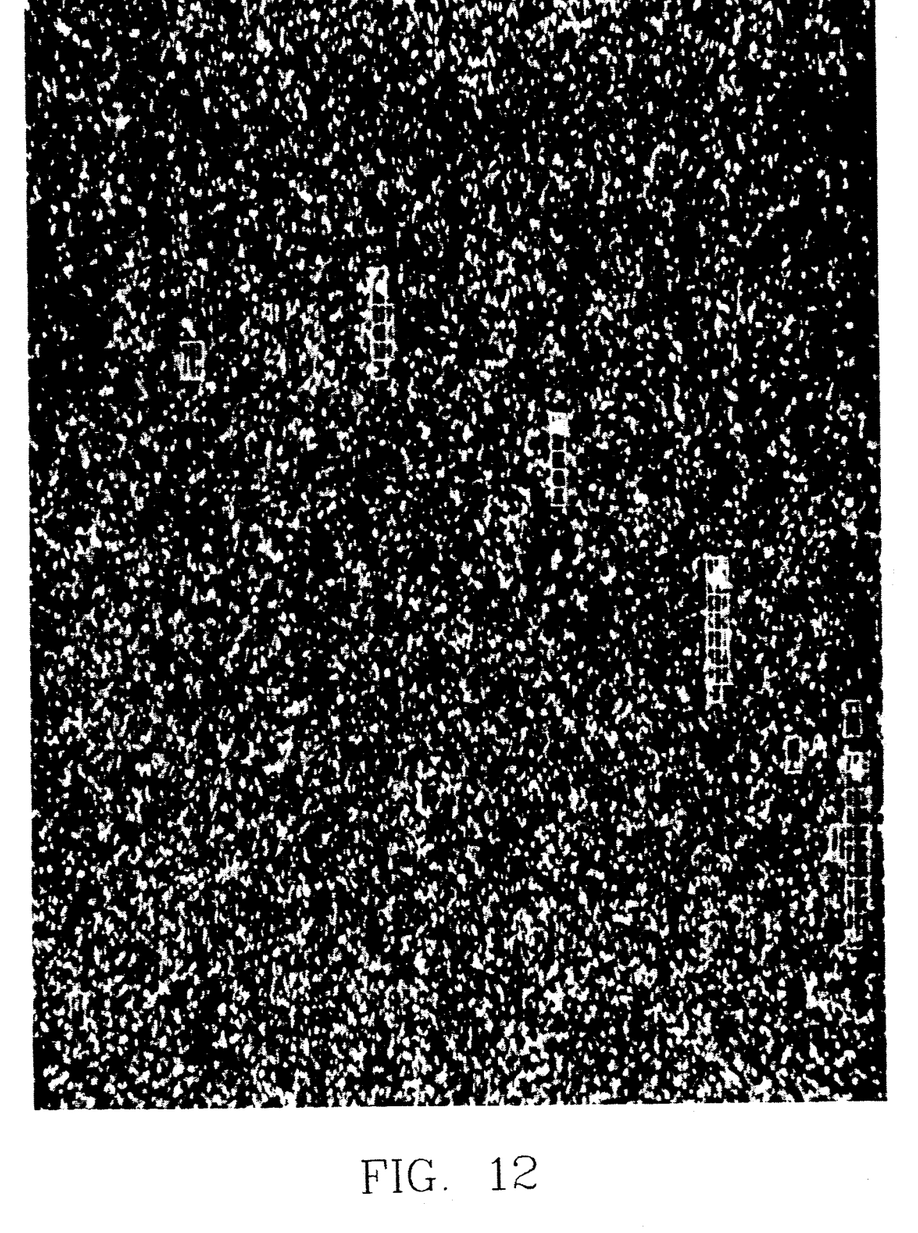
FIG. 12 is a sonar image of targets with graphical overlay showing the results of processing with the neural network detector.
Figure 13:
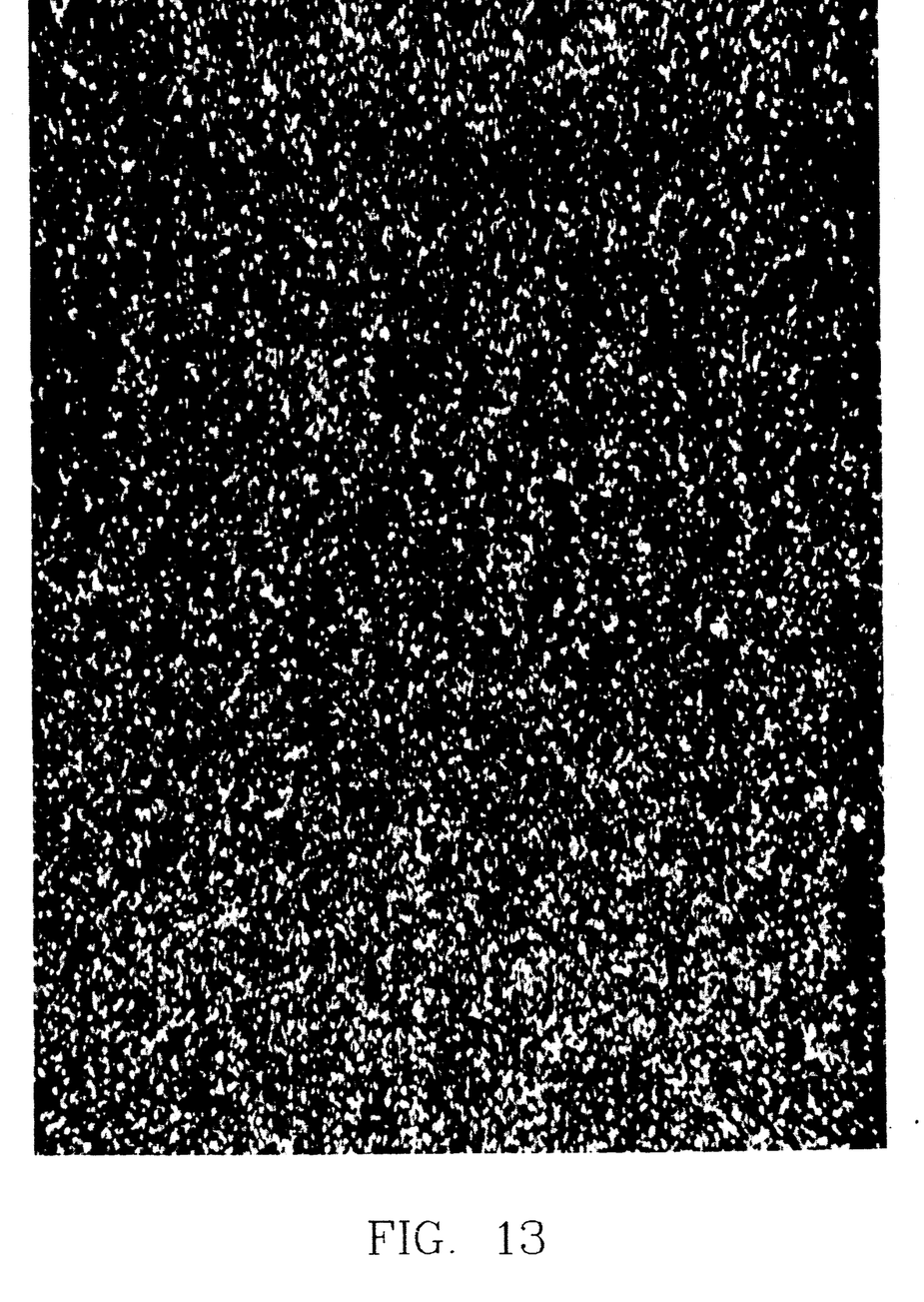
FIG. 13 is a sonar image of targets with graphical overlay showing the results of processing with the statistical detector.
Figure 14:
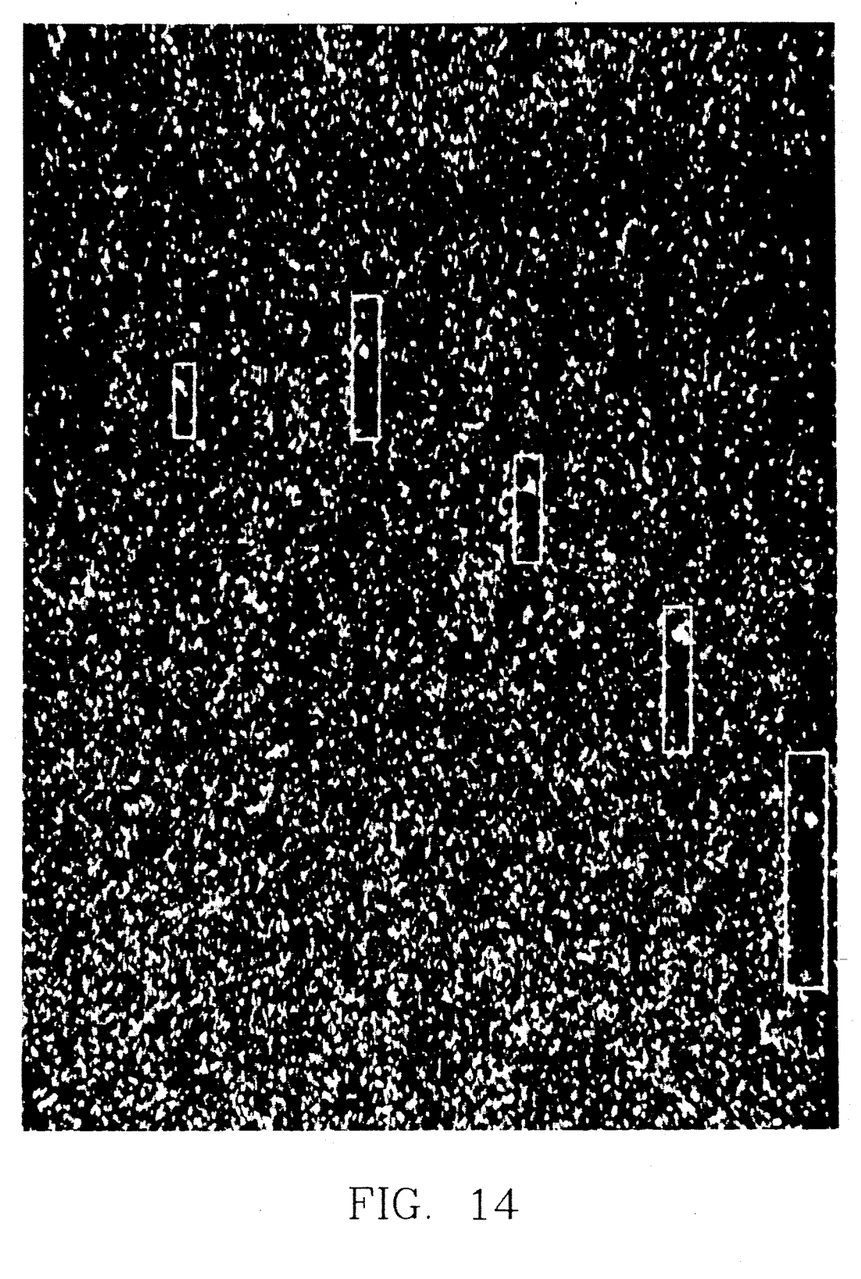
FIG. 14 is a sonar image of targets with graphical overlay showing the results of processing with the combined cuer.

The following non-limiting example is provided to demonstrate the performance of the system. In FIG. 10 a sonar image frame of 480 rows by 512 columns of pixels in displayed using a Polaroid copy of the CRT image screen. The image has been produced using the output from the Westinghouse AN/AQS14 side scan minehunting sonar. The sonar has insonified and received returns from a sand ocean bottom with 5 minelike objects which produce a significant highlight and shadow in the image. In FIG. 11 the overlapping scan windows (10 rows by 20 columns) that have been designated as target windows by the shadow-highlight detector are shown with the graphical overlay. In FIGS. 12 and 13 similar results are shown for the neural network and statistical detectors. FIG. 14 shows the results from the Combined Cuer which would be displayed to the analyst as an aid. Normally, only the sonar image of FIG. 14 is displayed to the analyst. The results of each cuer shown in FIGS. 11, 12 and 13 are presented here to aid in understanding our invention, but would not be displayed to the analyst. By comparing FIGS. 11 and 12 to FIG. 14 one can see that false alarms such as appear in the lower left corner have been eliminated by the combined cuer using the AND logic.

Although we have described and illustrated certain present preferred embodiments of our automatic target detection system, it should be distinctly understood that our invention is not limited thereto, but may be variously embodied within the scope of the following claims.

We claim:

1. A method of detecting and classifying features in a sonar image comprised of a matrix of pixels, each pixel having a known greyness level comprising the steps of:
   a) defining a set of windows, each window comprised of a set of adjacent pixels such that each pixel of the image is included in at least one window;
   b) thereafter for each window performing the steps of:
      i) filtering each window;
      ii) performing a Fourier transform of each window;
      iii) scaling each window;
      iv) classifying each window which has been processed under steps (i) thru (iii) as a highlight, shadow or background according to the greyness levels of the pixels in each window;
   c) selecting those windows which have been classified as highlight windows and shadow windows;
   d) recording a location for each selected window relative to the image; and
   e) classifying a set of windows as one of a highlight cluster, a shadow cluster, a highlight ridge, a shadow trough, an anomaly and background.

2. The method of claim 1 wherein each window is classified as highlight, shadow or background by applying a neural network algorithm to the window.

3. The method of claim 1 wherein a shadowhighlight algorithm is applied in step b(iv) by performing the steps of:
   a) creating a histogram for the image;
   b) defining sections of the histogram, each section having a mean and standard deviation;
   c) computing a threshold value for each section based on the mean and standard deviation;
   d) creating a binary image using the threshold value for each section of each convolved image;
   e) combining all binary images to produce a final binary image corresponding to all detections
   f) determining a number of all detections and a location for each detection by thresholding the final binary image; and
   g) reporting the location of each detection.

4. The method of claim 1 wherein a statistical detection algorithm is applied, the statistical algorithm performing steps which include:
   a) defining an image background window as reference window; and
   b) comparing each scanned overlapping window in the image with this background reference window.

5. The method of claim 1 wherein each window is classified as a highlight cluster, a shadow cluster, a highlight ridge, a shadow trough, an anomaly or background by applying a neural network algorithm to the window.

* * * * *